United States Patent [19]

Takagi et al.

[11] Patent Number: 4,723,863
[45] Date of Patent: Feb. 9, 1988

[54] METHOD AND MEANS FOR JOINING A CERAMIC SHAFT AND METAL SLEEVE

[75] Inventors: Shunichi Takagi; Atsushi Kanda, both of Aichi, Japan

[73] Assignee: NGK Spark Plug Co., Ltd., Aichi, Japan

[21] Appl. No.: 845,963

[22] Filed: Mar. 31, 1986

[30] Foreign Application Priority Data

Apr. 1, 1985 [JP] Japan ............................. 60-48246[U]

[51] Int. Cl.⁴ ......................... B25G 3/34; F16B 11/00
[52] U.S. Cl. ................................... 403/272; 403/404; 228/132
[58] Field of Search ................ 228/132, 134; 403/404, 403/179, 265, 271, 272, 268, 269

[56] References Cited

U.S. PATENT DOCUMENTS

| | | | |
|---|---|---|---|
| 3,402,458 | 9/1968 | Asaff ............................... | 228/134 X |
| 4,147,468 | 4/1979 | Murakami et al. ............. | 403/371 X |
| 4,167,351 | 3/1979 | Bindin ............................. | 403/404 X |
| 4,325,647 | 4/1982 | Maier et al. .................... | 403/404 X |
| 4,575,047 | 3/1986 | Boos et al. ..................... | 403/404 X |

*Primary Examiner*—Andrew V. Kundrat
*Attorney, Agent, or Firm*—Finnegan, Henderson, Farabow, Garrett and Dunner

[57] ABSTRACT

A joint for joining a ceramic shaft to a metal sleeve includes a gap separating the outer surface of the ceramic shaft from the inner surface of an overlapping portion of a metal sleeve. A brazing filler material is provided in only the portion of the gap proximate the end of the ceramic shaft to accommodate stresses caused by the different thermal characteristics of the metal sleeve and the ceramic shaft.

2 Claims, 3 Drawing Figures

METHOD AND MEANS FOR JOINING A CERAMIC SHAFT AND METAL SLEEVE

FIELD OF THE INVENTION

The present invention relates to a method and means for joining a ceramic shaft and a metal sleeve.

BACKGROUND OF THE INVENTION

As shown in FIG. 3, conventional joints joining ceramic shafts and metal sleeves include a ceramic shaft 31 that is fitted into a metal sleeve 32 and is joined thereto by means of a brazing filler material 33. It has also been known to form a joint by shrink-fitting a ceramic shaft into a metal sleeve.

In each type of conventional joints described above, the thermal expansion mismatch between the metal sleeve or brazing filler material and the ceramic shaft exerts a shear stress on the ceramic shaft in the vicinity of the area where it is fitted into the metal sleeve. This causes either failure of the ceramic shaft as it is being joined to the metal sleeve or deterioration of its thermal or mechanical durability after joining is completed. In order to avoid these troubles, it is necessary to use a brazing filler material having the appropriate strength and Young's modulus, or to control closely the dimensional precision of the area where the ceramic shaft is shrink-fitted into the metal sleeve. The former approach has the disadvantage of limited flexibility in the choice of suitable brazing filler materials, while the second solution is not economical.

OBJECTS AND SUMMARY OF THE INVENTION

An object of the present invention is a strong and durable joint for joining a ceramic shaft and a metal sleeve.

Another object of the present invention is a joint for joining a ceramic shaft and a metal sleeve in a manner that accommodates the difference in the thermal expansion of the ceramic and metal.

A further object of the present invention is an inexpensive joint for reliably joining a ceramic shaft and a metal sleeve.

These and other objects are obtained by a joint joining a ceramic shaft and a metal sleeve comprising a portion of the metal sleeve overlapping an end of the ceramic shaft for a first distance, the interior diameter of the portion of the metal sleeve being sufficiently larger than the overlapped portion of the ceramic shaft to provide a gap between the portion of the metal sleeve and the overlapped portion of the ceramic shaft, and a brazing material filling the gap for a second distance that is less than the first distance whereby the gap is filled with the brazing material for only a part of the portion of the metal sleeve which overlaps the end of the ceramic shaft.

BRIEF DESCRIPTION OF THE DRAWINGS

The manner in which the above objects and other objects, features, and advantages of the present invention are attained will become fully apparent from the following detailed description when it is considered in the light of the drawings, wherein.

DETAILED DESCRIPTION

In accordance with the present invention, a gap is formed at the open end of the area where a ceramic shaft is fitted into a metal sleeve to block or relieve the shear stress exerted on the ceramic shaft by the metal sleeve or by a brazing filler material in the vicinity of the open end of that area. In addition, stress acting on that area will be distributed between the metal sleeve around the gap and the ceramic shaft.

Figure 1:
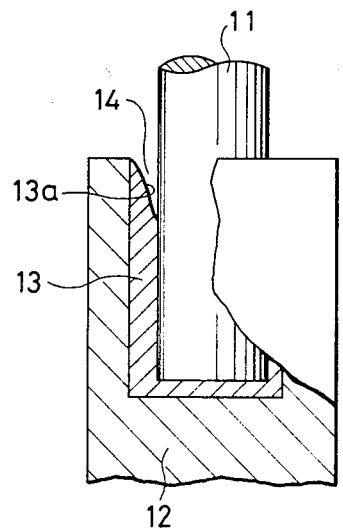
FIG. 1 is longitudinal section of a ceramic-to-metal joint according to one embodiment of the present invention.

FIG. 1 is a longitudinal section showing the essential parts of the structure in which a ceramic shaft is joined to a metal sleeve in accordance with one embodiment of the present invention. A ceramic shaft 11 is fitted into the metal sleeve 12 in a manner to form a gap at the open end of the area where the ceramic shaft 11 is fitted into the metal sleeve 12. A brazing filler material 13 fills the gap between the ceramic shaft 11 and the metal sleeve 12 except for an end portion 14 of the gap. In the embodiment shown, the brazing filler material 13 has good capability of wetting the metal sleeve 12 but the ceramic shaft 11 is not wetted to the same degree as the metal sleeve 12. As a consequence of this difference in wettability, the exposed surface 13a of the brazing filler material 13 is inclined with respect to the ceramic shaft 11, so that the portion 14 of the gap has a substantially triangular cross section at the open end of the area where the ceramic shaft 11 is fitted into the metal sleeve 12.

Figure 2:
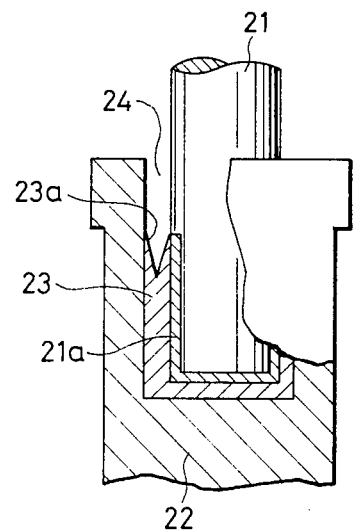
FIG. 2 is a longitudinal section of a second embodiment of a ceramic-to-metal joint according to the present invention.
Figure 3:
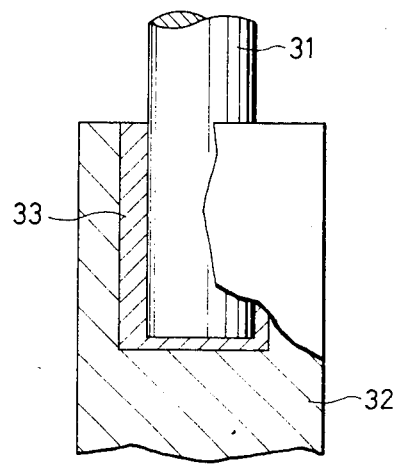
FIG. 3 is a longitudinal section of a conventional ceramic-to-metal joint.

FIG. 2 is a longitudinal section showing another embodiment of the present invention. A ceramic shaft 21 is fitted into the metal sleeve 22 and a metalized film 21a is formed on the mating surface of the ceramic shaft 21 by thick-film printing, vapor deposition, or other suitable techniques. A brazing filler material 23 joins the ceramic shaft 21 and the metal sleeve 22 except for an end or top portion 24 of the gap between the shaft 21 and the sleeve 22. In the embodiment shown in FIG. 2, the mating surface of the ceramic shaft 21 is metallized so that the brazing filler material 23 has a good capability of wetting both the metal sleeve 22 and the ceramic shaft 21. As a result, the exposed surface 23a of the brazing filler material assumes a substantially V- or U-shaped cross section. As a result, the portion 24 of the gap has a generally pentagonal cross section at the open end where the ceramic shaft 21 is fitted into the metal sleeve 22.

In the present invention, the ratio of the space between the mating surfaces of the ceramic shaft and the metal sleeve that is filled with the brazing filler material is not limited to any particular value. It should be noted, however, that if the ratio is excessively large, the desired strength is not imparted to the bond between the ceramic shaft and the metal sleeve. If the ratio is too small, the intended advantages of the present invention will not be attained. It is therefore desirable that the value of this ratio be determined for each specific use of the joint of the present invention on the basis of preliminary testing wherein the ratio is set at varying values so as to evaluate the characteristics of the joint relative to each value tested.

In accordance with the present invention, a ceramic shaft can be fitted into a metal sleeve without experiencing any failure. In addition, a ceramic shaft fitted into the metal sleeve as taught herein exhibits improved thermal and mechanical durability. This provides flexibility in the choice of an appropriate brazing filler material. Furthermore, since the ceramic shaft is joined to the metal sleeve with a brazing filler material, there is no need for closely controlling the dimensional precision of the area where the two components are joined.

What is claimed is:

1. A junction structure between a ceramic shaft and a metal sleeve comprising:
    a metal sleeve having at least an open end;
    a ceramic shaft fitted into the open end of the metal sleeve; and
    a brazing material having an exposed surface joining the metal sleeve to the ceramic shaft, said exposed surface of said brazing material and a surface of the ceramic shaft forming a generally inclined V-shaped gap in the region proximate to the open end of the metal sleeve.

2. A junction structure between a ceramic shaft and a metal sleeve comprising:
    a metal sleeve having at least an open end;
    a ceramic shaft having a metallized surface for forming a junction between the metal sleeve and the ceramic shaft, the ceramic shaft being fitted into the open end of the metal sleeve; and
    a brazing material having an exposed surface joining a surface of the metal sleeve to the metallized junction surface of the ceramic shaft, said exposed surface of said brazing material being generally of V- or U-shaped cross-section in the region proximate to the open end of the metal sleeve.

* * * * *